(12) United States Patent
Hsia

(10) Patent No.: US 10,485,073 B1
(45) Date of Patent: Nov. 19, 2019

(54) SOLID-STATE LIGHTING WITH DUAL MODE OPERATIONS

(71) Applicant: Aleddra Inc., Renton, WA (US)

(72) Inventor: Chungho Hsia, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days.

(21) Appl. No.: 16/547,502

(22) Filed: Aug. 21, 2019

Related U.S. Application Data

(63) Continuation-in-part of application No. 16/530,747, filed on Aug. 2, 2019, which is a continuation-in-part of application No. 16/458,823, filed on Jul. 1, 2019, which is a continuation-in-part of application No. 16/432,735, filed on Jun. 5, 2019, now Pat. No. 10,390,396, which is a continuation-in-part of application No. 16/401,849, filed on May 2, 2019, now Pat. No. 10,390,395, which is a continuation-in-part of application No. 16/296,864, filed on Mar. 8, 2019, now Pat. No. 10,390,394, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a
(Continued)

(51) Int. Cl.
*H05B 33/08* (2006.01)
*H02M 7/06* (2006.01)
*H02M 1/42* (2007.01)
*H02M 1/44* (2007.01)
*H02J 7/04* (2006.01)

(52) U.S. Cl.
CPC ............ *H05B 33/0887* (2013.01); *H02J 7/04* (2013.01); *H02M 1/4208* (2013.01); *H02M 1/44* (2013.01); *H02M 7/06* (2013.01); *H05B 33/0815* (2013.01)

(58) Field of Classification Search
None
See application file for complete search history.

(56) References Cited

U.S. PATENT DOCUMENTS 5,666,029 A * 9/1997 McDonald ........... G01R 31/245
315/120
8,629,574 B2 * 1/2014 Porter ................... H02J 7/0024
307/66
(Continued)

*Primary Examiner* — Minh D A
*Assistant Examiner* — James H Cho
(74) *Attorney, Agent, or Firm* — Han IP PLLC; Andy M. Han

(57) ABSTRACT

A light-emitting diode (LED) lighting system comprising a luminaire and a power pack is used to replace the luminaire operated only in a normal mode with alternate-current (AC) mains. The luminaire comprises LED arrays and a power supply whereas the power pack comprises a rechargeable battery, a charging circuit, an LED driving circuit, and a self-diagnostic circuit. According to availability of the AC mains, the LED lighting system can auto-select to work in an emergency mode when a line voltage from the AC mains is unavailable. The self-diagnostic circuit comprises multiple timers and multiple detection circuits and is configured to provide a sequence and to auto-test battery charge and discharge current according to the sequence. In another embodiment, the luminaire power pack is integrated into an enhanced LED luminaire to support such dual mode operations.

43 Claims, 7 Drawing Sheets

Related U.S. Application Data continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

| | | | |
|---|---|---|---|
| 2013/0127362 A1* | 5/2013 | Trainor | H02J 9/065 315/224 |
| 2014/0091720 A1* | 4/2014 | Brinlee | H05B 33/0815 315/186 |

* cited by examiner

SOLID-STATE LIGHTING WITH DUAL MODE OPERATIONS

CROSS-REFERENCE TO RELATED APPLICATIONS

The present disclosure is part of a continuation-in-part (CIP) application of U.S. patent application Ser. No. 16/530,747, filed 2 Aug. 2019, which is part of CIP application of U.S. patent application Ser. No. 16/458,823, filed 1 Jul. 2019, which is part of CIP application of U.S. patent application Ser. No. 16/432,735, filed 5 Jun. 2019 and issued as U.S. Pat. No. 10,390,396 on 20 Aug. 2019, which is part of CIP application of U.S. patent application Ser. No. 16/401,849, filed 2 May 2019 and issued as U.S. Pat. No. 10,390,395 on 20 Aug. 2019, which is part of CIP application of U.S. patent application Ser. No. 16/296,864, filed 8 Mar. 2019 and issued as U.S. Pat. No. 10,390,394 on 20 Aug. 2019, which is part of CIP application of U.S. patent application Ser. No. 16/269,510, filed 6 Feb. 2019 and issued as U.S. Pat. No. 10,314,123 on 4 Jun. 2019, which is part of CIP application of U.S. patent application Ser. No. 16/247,456, filed 14 Jan. 2019 and issued as U.S. Pat. No. 10,327,298 on 18 Jun. 2019, which is part of CIP application of U.S. patent application Ser. No. 16/208,510, filed 3 Dec. 2018 and issued as U.S. Pat. No. 10,237,946 on 19 Mar. 2019, which is part of CIP application of U.S. patent application Ser. No. 16/154,707, filed 8 Oct. 2018 and issued as U.S. Pat. No. 10,225,905 on 5 Mar. 2019, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to light-emitting diode (LED) lighting systems and more particularly to an LED lighting system that includes a self-diagnostic circuit in a dual mode luminaire to operate thereof and to auto-test charging and discharging current of a rechargeable battery, ensuring the dual mode luminaire to work at all times.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an AC mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies.

Furthermore, the AC mains-operable LED lamps can easily be used with emergency lighting, which is especially important in this consumerism era. The emergency lighting systems in retail sales and assembly areas with an occupancy load of 100 or more are required by codes in many cities. Occupational Safety and Health Administration (OSHA) requires that a building's exit paths be properly and automatically lighted at least ninety minutes of illumination at a minimum of 10.8 lux so that an employee with normal vision can see along the exit route after the building power becomes unavailable. This means that emergency egress lighting must operate reliably and effectively during low visibility evacuations. To ensure reliability and effectiveness of backup lighting, building owners should abide by the National Fire Protection Association's (NFPA) emergency egress light requirements that emphasize performance, operation, power source, and testing. OSHA requires most commercial buildings to adhere to the NFPA standards or a significant fine. Meeting OSHA requirements takes time and investment, but not meeting them could result in fines and even prosecution. If a building has egress lighting problems that constitute code violations, the quickest way to fix is to replace existing lamps with multi-function LED lamps that have an emergency light package integrated with the normal lighting. The code also requires the emergency lights be inspected and tested to ensure they are in proper working conditions at all times. It is, therefore, the manufacturers' responsibility to design an LED lamp, an LED luminaire, or an LED lighting system with a self-diagnostic mechanism such that after the LED lamp or the LED luminaire is installed on a ceiling or a high place in a room, the self-diagnostic mechanism can work with an emergency battery backup system to periodically auto-test charging and discharging current to meet regulatory requirements.

SUMMARY

An LED lighting system comprising a luminaire and a luminaire power pack is used to replace a fluorescent or an LED lamp normally operated with the AC mains. In one embodiment. The luminaire is cascaded by the luminaire power pack. The luminaire comprises one or more LED arrays with a forward voltage across thereof and a power supply unit that powers the one or more LED arrays. The luminaire power pack comprises a rechargeable battery, a line voltage detection and control circuit, and an LED driving circuit configured to receive power from the rechargeable battery and to generate a voltage operating the one or more LED arrays when the line voltage from the AC mains is unavailable. The line voltage detection and control circuit comprises a self-diagnostic circuit and a relay switch. The line voltage detection and control circuit is configured to either enable or disable the LED driving circuit according to availability of the AC mains. The relay switch comprises a power sensing coil with a pick-up voltage.

The power supply unit comprises at least two electrical conductors configured to receive an input voltage, a main full-wave rectifier, and an input filter. The at least two electrical conductors are configured to couple to the luminaire power pack. The main full-wave rectifier is coupled to the at least two electrical conductors and configured to convert the input voltage into a primary direct-current (DC) voltage. The input filter is configured to suppress electromagnetic interference (EMI) noises. The power supply unit further comprises a power switching converter comprising a main transformer and a power factor correction (PFC) and power switching circuit. The PFC and power switching circuit is coupled to the main full-wave rectifier via the input filter and configured to improve a power factor and to convert the primary DC voltage into a secondary DC voltage. The secondary DC voltage is configured to directly or indirectly couple to the one or more LED arrays to operate thereof.

The LED luminaire power pack further comprises at least one full-wave rectifier and a charging circuit. The at least one full-wave rectifier is coupled to the AC mains and configured to convert the line voltage from the AC mains into a first DC voltage. The charging circuit comprises a control device, a first transformer, a first ground reference, and a second ground reference electrically isolated from the first ground reference. The charging circuit is coupled to the at least one full-wave rectifier and configured to convert the first DC voltage into a second DC voltage that charges the rechargeable battery to reach a third DC voltage. The charging circuit is configured to monitor the second DC voltage and to regulate the control device in response to various charging requirements. The LED driving circuit comprises a second transformer having a primary winding and a secondary winding. The LED driving circuit is configured to receive the third DC voltage from the rechargeable battery and to convert the third DC voltage into a fourth AC or DC voltage depending on whether a rectifier is used or not when the line voltage from the AC mains is unavailable.

The self-diagnostic circuit comprises multiple timers. Each of the multiple timers respectively comprises a first time delay and a second time delay. Upon application of the third DC voltage to the self-diagnostic circuit, the first time delay in each of the multiple timers begins. At an end of the first time delay an output of the self-diagnostic circuit is energized and remains energized so as to activate the LED driving circuit for the second time delay in each of the multiple timers. At an end of the second time delay in each of the multiple timers the output of the self-diagnostic circuit is de-energized. The first time delay and the second time delay in each of the multiple timers form a sequence, which repeats until the third DC voltage is removed from the self-diagnostic circuit. The respective first time delay in at least one of the multiple timers comprises a first time delay of 30 days. The respective second time delay in at least one of the multiple timers comprises a second time delay of 30 seconds. The respective first time delay in at least one of the multiple timers comprises a first time delay of 365 days. The respective second time delay in at least one of the multiple timers comprises a second time delay of 90 minutes. The self-diagnostic circuit further comprises multiple detection circuits configured to test battery charge and discharge current. At least one of the multiple detection circuits comprises a first reference voltage. The at least one of the multiple detection circuits is configured to receive the second DC voltage. When the second DC voltage is tested to be less than the first reference voltage during the first time delay, the at least one of the multiple detection circuits outputs a first malfunction signal to indicate that the battery charge current does not reach a predetermined minimum. At least another one of the multiple detection circuits comprises a second reference voltage. The at least one of the multiple detection circuits is configured to receive the third DC voltage. When the third DC voltage is tested to be less than the second reference voltage during the second time delay, the at least one of the multiple detection circuits outputs a second malfunction signal to indicate that the battery discharge current does not reach a predetermined minimum. The second reference voltage may be referred to as a nominal voltage in a range from 85% to 87.5% of either a rated terminal voltage of the rechargeable battery or the third DC voltage before testing.

The relay switch further comprises a first pair of input electrical terminals, a second pair of input electrical terminals, and a third pair of input electrical terminals. The third pair of input electrical terminals are configured to receive the pick-up voltage to operate the power sensing coil. The relay switch further comprises a pair of output electrical terminals configured to relay either a first input voltage appeared at the first pair of input electrical terminals or the fourth AC or DC voltage appeared at the second pair of input electrical terminals to the pair of output electrical terminals when activated. In one case, the first input voltage is the line voltage from the AC mains whereas the fourth AC or DC voltage is a high voltage in an input operating voltage range of the luminaire. The second transformer further comprises a third winding, a rectifier, and at least one capacitor. The rectifier and the at least one capacitor configured to couple to the third winding and to generate the at least one low DC output voltage compatible to 0-to-10 V (volts) when the line voltage from the AC mains is unavailable. The power switching converter further comprises a pulse width modulation (PWM) control circuit and a pair of input ports configured to receive a 0-to-10 V (volts) signal, a 1-to-10 V (volts) signal, a PWM signal, or a signal from a variable resistor for luminaire dimming applications. The at least one low DC output voltage is configured to control the power supply unit to operate with a fraction of power consumed when the line voltage from the AC mains is available. In this case, a combination of the at least one low DC output voltage and the fourth AC or DC voltage is configured to maintain stability of the power supply unit in a way that the one or more LED arrays are operated without strobing. In another case, the first input voltage is the secondary DC voltage whereas the fourth AC or DC voltage is rectified by a rectifier as a fifth DC voltage which is greater than the forward voltage of the one or more LED arrays.

The control device is configured to receive a signal voltage from the self-diagnostic circuit. When a rechargeable battery test is performed, the self-diagnostic circuit is energized by the third DC voltage to activate the LED driving circuit and to pull down the signal voltage, thereby inactivating the charging circuit. The line voltage detection and control circuit may further comprise a flyback diode and a capacitor connected in parallel with the flyback diode. The flyback diode is connected in parallel with the power sensing coil and is with a reverse polarity from the second DC voltage. When the second DC voltage is greater than the third DC voltage, the pick-up voltage is built up for the power sensing coil to operate. The power sensing coil may be further configured to provide a current path to charge the rechargeable battery The line voltage detection and control circuit further comprises a first current guiding diode and a second current guiding diode. The first current guiding diode and the second current guiding diode are configured to conduct a charging current in one direction and a discharging current in another direction such that the second DC voltage is distinct from the third DC voltage. The self-diagnostic circuit may further comprise an interface circuit configured to communicate and coordinate with the charging circuit, the rechargeable battery, the LED driving circuit, the power switching converter, and the multiple timers for proper operations and rechargeable battery tests. The self-diagnostic circuit may be implemented by using a microcontroller, a microchip, or a programmable logic controller. In another embodiment, the power pack is integrated into an enhanced LED luminaire with the self-diagnostic circuit to auto-test charging and discharging current of a rechargeable battery, supporting dual mode operations of the enhanced LED luminaire to work not only in a normal mode but also in an emergency mode.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified. Moreover, in the section of detailed description of the invention, any of a "main", a "primary", a "secondary", a "first", a "second", a "third", and so forth does not necessarily represent a part that is mentioned in an ordinal manner, but a particular one.

DETAILED DESCRIPTION OF THE INVENTION

Figure 1:
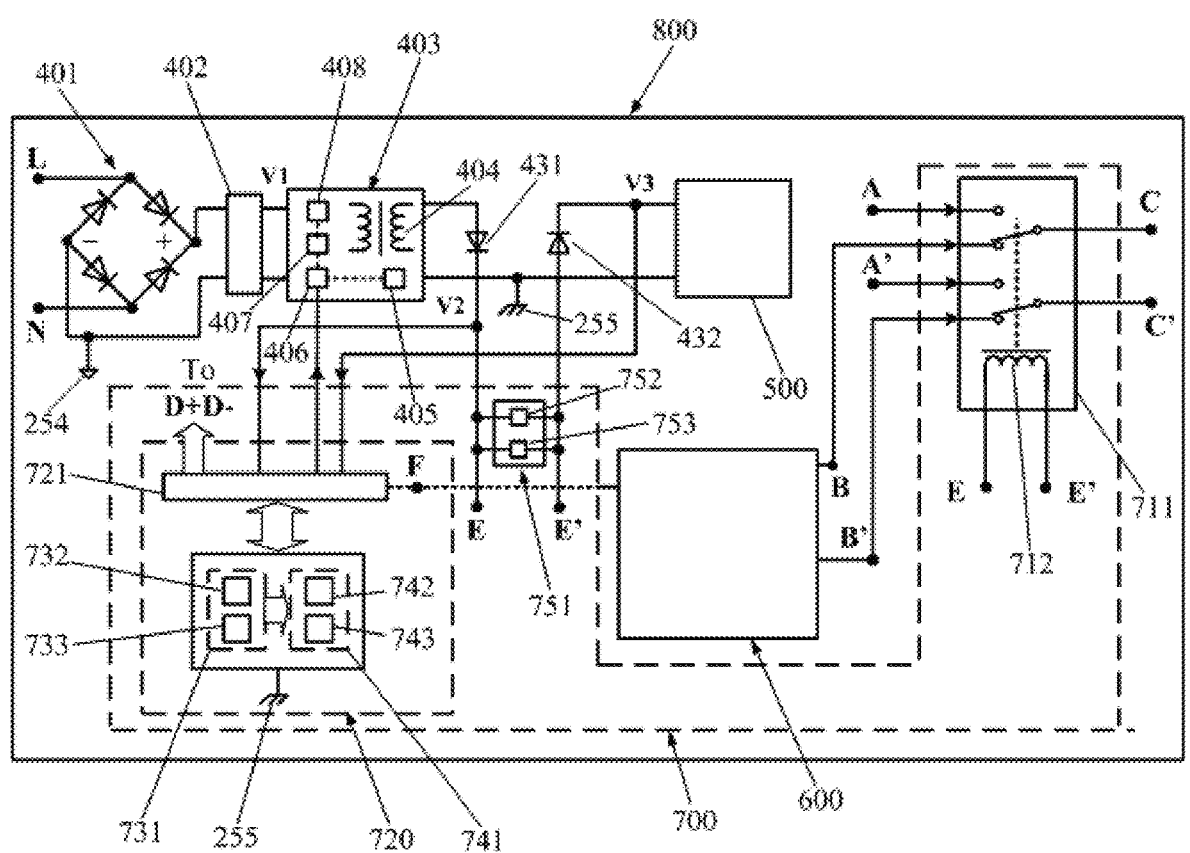
FIG. 1 is a block diagram of a luminaire power pack according to the present disclosure.

FIG. 1 is a block diagram of a luminaire power pack according to the present disclosure. The luminaire power pack 800 comprises at least two electrical conductors denoted as "L" and "N" configured to couple to alternate-current (AC) mains, a rechargeable battery 500, a full-wave rectifier 401, an input filter 402, a charging circuit 403, an LED driving circuit 600, and a line voltage detection and control circuit 700. In FIG. 1, the full-wave rectifier 401 is coupled to the AC mains and configured to convert the line voltage from the AC mains into a first DC voltage, V1, after the input filter 402. The charging circuit 403 is an isolated step-down converter and comprises a first ground reference 254, a second ground reference 255 electrically isolated from the first ground reference 254, a first transformer 404, a feedback control circuit 405, a control device 406, a first electronic switch 407, and a diode 408. The charging circuit 403 is coupled to the full-wave rectifier 401 via the input filter 402 and configured to convert the first DC voltage, V1, into a second DC voltage, V2, that charges the rechargeable battery 500 to reach a third DC voltage, V3. The feedback control circuit 405 is configured to monitor the second DC voltage, V2, and to regulate the control device 406 according to charging voltage and current requirements. The first transformer 404 comprises a primary winding coupled to the first ground reference 254 and a secondary winding coupled to the second ground reference 255. The first transformer 404 is configured to provide electrical isolation between the AC mains and the second DC voltage, V2, with respect to the second ground reference 255.

Figure 2:
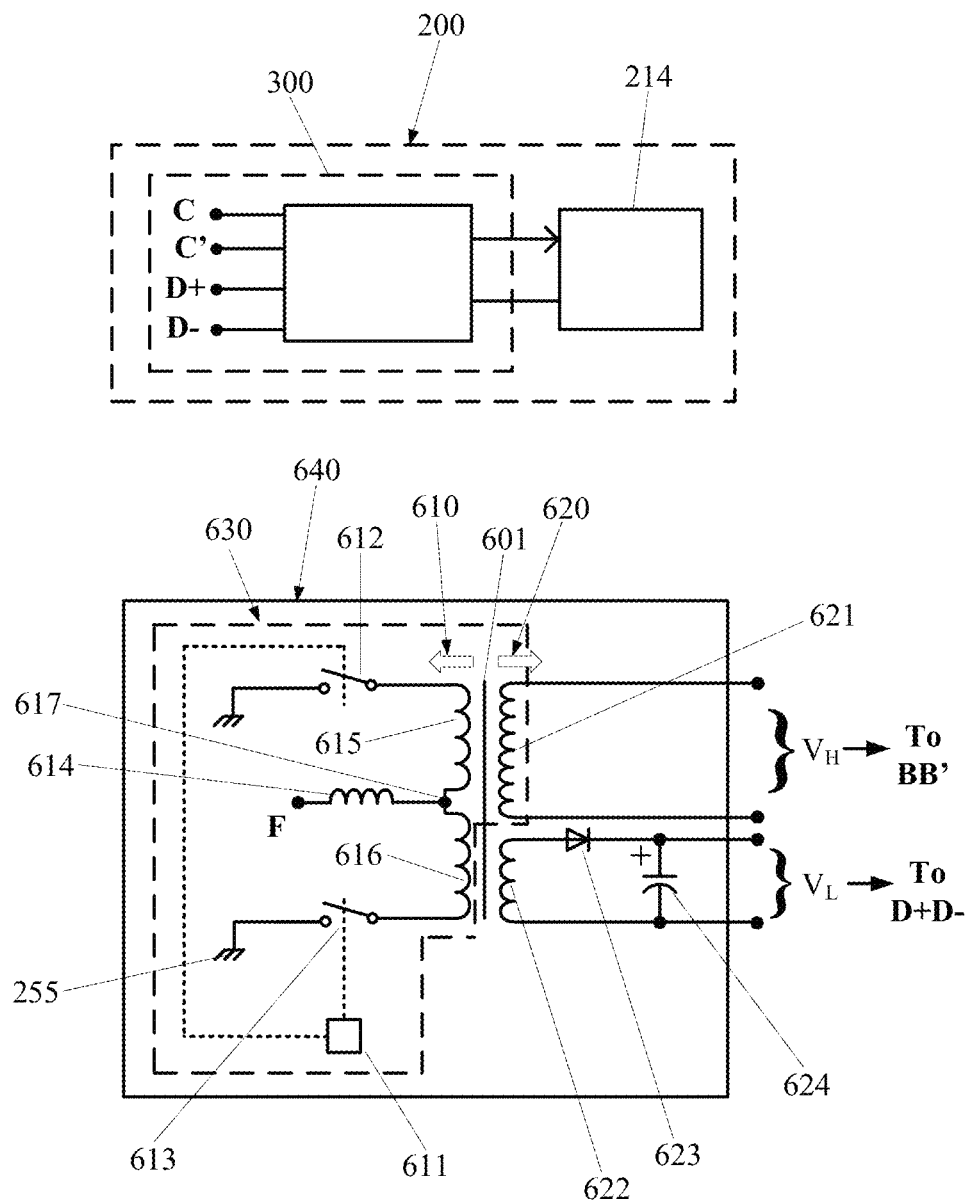
FIG. 2 is a block diagram of a first embodiment of an LED driving circuit according to the present disclosure.

FIG. 2 is a block diagram of a first embodiment of the LED driving circuit 600 according to the present disclosure. Referring to FIG. 1 and FIG. 2, the first embodiment 640 of the LED driving circuit 600 comprises a second transformer 601 having a primary side 610 and a secondary side 620. The second transformer 601 comprises a secondary winding 621 and a third winding 622. The first embodiment 640 of the LED driving circuit 600 is configured to receive the third DC voltage, V3, from the rechargeable battery 500 and to convert the third DC voltage, V3, into at least one high output voltage, $V_H$, and at least one low DC output voltage, $V_L$, when the line voltage from the AC mains is unavailable. The at least one high output voltage, $V_H$, is compatible to a voltage in an input operating voltage range of the power supply unit whereas the at least one low DC output voltage is compatible to a voltage in a range of 0-to-10 volts. The Connected to the third winding 622 are a rectifier 623 and at least one capacitor 624. The rectifier 623 and the at least one capacitor 624 are configured to generate the at least one low DC output voltage, $V_L$, when the line voltage from the AC mains is unavailable. The at least one low DC output voltage, $V_L$, is coupled to an external power supply unit 300 (FIG. 2) via a pair of ports denoted as "DD'" and configured to control the external power supply unit 300 in an external luminaire 200 to operate with a fraction of power consumed when the line voltage from the AC mains is available, whereas a combination of the at least one low DC output voltage, $V_L$, and the at least one high output voltage, $V_H$, is configured to maintain stability of the external power supply unit 300 in a way that external one or more LED arrays 214 connected to the external power supply unit 300 are operated without strobing. The primary side 610 comprises a control unit 611, a second electronic switch 612, a third electronic switch 613, an upper portion 615 of a center-tapped winding, a lower portion 616 of the center-tapped winding, and a center-tapped port 617 coupled between the upper portion 615 of the center-tapped winding and the lower portion 616 of the center-tapped winding. The center-tapped port 617 may be directly coupled to a high-potential electrode of the rechargeable battery 500 or via an inductor 614. The upper portion 615 of the center-tapped winding is driven in one direction of a current flow with the second electronic switch 612 activated, whereas the lower portion 616 of the center-tapped winding is driven in the opposite direction of the current flow with the third electronic switch 613 activated. Each of the first electronic switch 407, the second electronic switch 612, and the third electronic switch 613 comprises a metal-oxide-semiconductor field-effect transistor (MOSFET) or a transistor.

In FIG. 1, the line voltage detection and control circuit 700 comprising a relay switch 711 comprises a power sensing coil 712 with a pick-up voltage and a drop-out voltage. The relay switch 711 further comprises a first pair, a second pair, and a third pair of input electrical terminals. The first pair of input electrical terminals denoted as "AA'" are configured to couple to a first input voltage, whereas the second pair of input electrical terminals denoted as "BB'" are configured to couple to the LED driving circuit 600. If the first embodiment 640 of the LED driving circuit 600 is adopted as depicted in FIG. 2, the first pair of input electrical terminals AA' should be coupled to the AC mains to receive the line voltage whereas the second pair of input electrical terminals BB' should receive the at least one high output voltage, $V_H$. The third pair of input electrical terminals denoted as "EE'" are configured to receive the pick-up voltage to operate the power sensing coil 712. The relay switch 711 further comprises a pair of output electrical terminals denoted as "CC'" configured, in this case, to relay either the line voltage appeared at the first pair of input electrical terminals AA' from the AC mains or the at least one high output voltage, $V_H$, appeared at the second pair of input electrical terminals BB' to the external power supply unit 300 to operate thereof, subsequently powering up the one or more LED arrays 214 connected with the external power supply unit 300. In other words, the relay switch 711 comprises a double-pole double-throw (DPDT) configuration, in which either the line voltage from the AC mains or the at least one high output voltage, $V_H$, can be simultaneously coupled to the external power supply unit 300 to respectively operate thereof without crosstalk. Although both the line voltage from the AC mains and the at least one high output voltage, $V_H$, can operate the external power supply unit 300, the at least one high output voltage, $V_H$, may be less than the line voltage from the AC mains. Nevertheless, the at least one high output voltage, $V_H$, is within an input operating voltage range of the external power supply unit 300 to avoid an under-voltage lockout occurring. Besides, the first embodiment 640 of the LED driving circuit 600 provides a fraction of power the external power supply unit 300 consumes when the line voltage from the AC mains is available.

Figure 3:
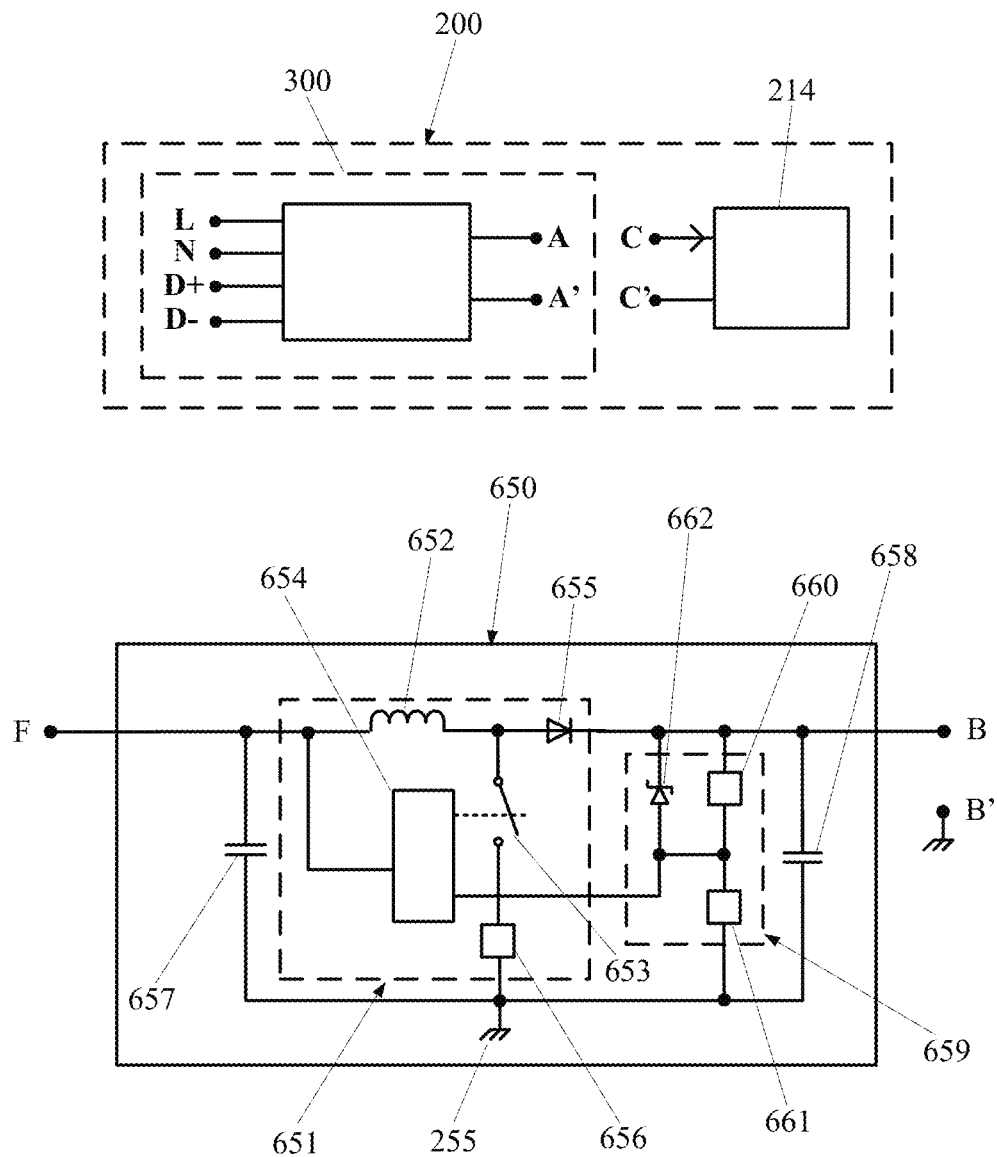
FIG. 3 is a block diagram of a second embodiment of an LED driving circuit according to the present disclosure.

FIG. 3 is a block diagram of a second embodiment of the LED driving circuit according to the present disclosure. In FIG. 3, the second embodiment 650 of the LED driving circuit 600 comprises a step-up converter 651 comprising an input inductor 652, an electronic switch 653, a logic control device 654, at least one diode rectifier 655, and a sensing resistor 656. The second embodiment 650 of the LED driving circuit 600 further comprises an input capacitor 657, an output capacitor 658 coupled between the at least one diode rectifier 655 and the second ground reference 255, and a voltage divider 659 comprising a Zener diode 662, a first resistor 660, and a second resistor 661, in which the input capacitor 657 and the output capacitor 658 are configured to filter out unwanted voltage noises generated from the step-up converter 651 and to boost the third DC voltage, V3, into the fifth DC voltage, V5, appearing at port "BB'" with respect to the second ground reference 255. The logic control device 654 is configured to extract part of the fifth DC voltage, V5, from the voltage divider 659 to control the electronic switch 653 "on" and "off". The electronic switch 653 comprises a metal-oxide-semiconductor field-effect transistor (MOSFET) or a transistor. The second embodiment 650 of the LED driving circuit 600 is configured to couple to the third DC voltage, V3, via the port denoted as "F" from the rechargeable battery 500 and to convert the third DC voltage, V3, into a fifth DC voltage, V5, when the line voltage from the AC mains is unavailable. The fifth DC voltage, V5, is greater than the forward voltage across the external one or more LED arrays 214 to make sure that the fifth DC voltage, V5, can operate the external one or more LED arrays 214 when the line voltage from the AC mains is unavailable.

Referring to FIG. 1 and FIG. 3, when the second embodiment 650 of the LED driving circuit 600 is adopted as depicted in FIG. 3, the first pair of input electrical terminals AA' of the relay switch 711 should be coupled to the output terminals denoted as "AA'" of the external power supply unit 300 to receive the first input voltage whereas the second pair of input electrical terminals BB' should receive the fifth DC voltage, V5. The relay switch 711 is configured, in this case, to relay either the first input voltage appeared at the first pair of input electrical terminals AA' from the external power supply unit 300 or the fifth DC voltage, V5, appeared at the second pair of input electrical terminals BB' to the pair of output electrical terminals CC', coupled further to the external one or more LED arrays 214 to operate thereof.

In FIG. 1, the line voltage detection and control circuit 700 further comprises a self-diagnostic circuit 720. The line voltage detection and control circuit 700 is configured to either enable or disable the LED driving circuit 600 via the port denoted as "F" according to availability of the AC mains. The self-diagnostic circuit 720 comprises multiple timers 731 and multiple detection circuits 741. The multiple timers 731 and the multiple detection circuits 741 are configured to auto-test charging and discharging current of the rechargeable battery 500. The self-diagnostic circuit 720 is further configured to disable the relay switch 711 when required. The line voltage detection and control circuit 700 further comprises a coupling module 751 comprising a flyback diode 752 and a capacitor 753 connected in parallel with the flyback diode 752, in which the flyback diode 752 is with a reverse polarity from the second DC voltage, V2. The coupling module 751 is connected in parallel with the power sensing coil 712. When the second DC voltage, V2, is greater than the third DC voltage, V3, the pick-up voltage is built up for the power sensing coil 712 to operate. In FIG. 1, the line voltage detection and control circuit 700 further comprises a first and a second current guiding diodes 431 and 432. The first current guiding diode 431 and the second current guiding diode 432 are configured to conduct a charging current in one direction and a discharging current in another direction such that the second DC voltage, V2, is distinct from the third DC voltage, V3. The charging circuit 403 may further comprise at least one capacitor (not shown) between the second DC voltage, V2, and the second ground reference 255. In FIG. 1, the control device 406 is configured to receive a signal voltage from the self-diagnostic circuit 720. When a rechargeable battery test is performed, the self-diagnostic circuit 720 is energized to activate the LED driving circuit 600 and to pull down the signal voltage, thereby inactivating the charging circuit 403.

Figure 4:
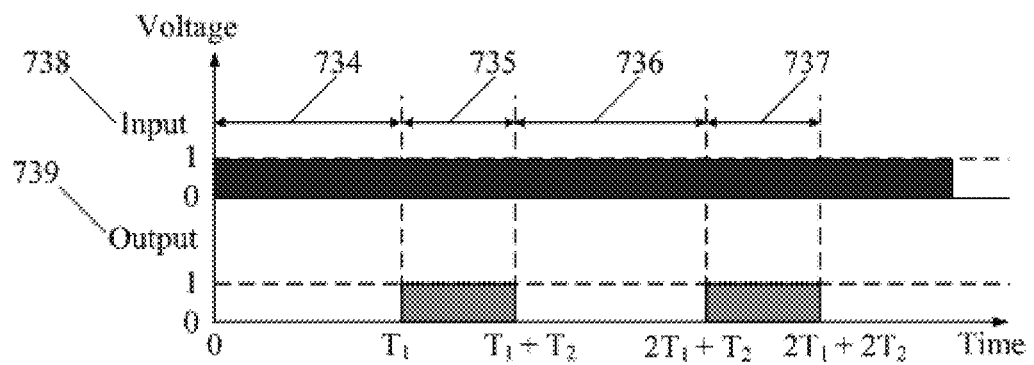
FIG. 4 is a timing diagram of a self-diagnostic circuit according to the present disclosure.

FIG. 4 is a timing diagram of a self-diagnostic circuit according to the present disclosure. Each of the multiple timers 731 (FIG. 1), for example, 732 and 733, comprises a first time delay 734 as a duration of T1 and a second time delay 735 as a duration of T2. Upon application of the third DC voltage to an input 738 of the self-diagnostic circuit 720, the first time delay 734 begins whereas at the end of the first time delay 734, an output 739 of the self-diagnostic circuit 720 is energized and remains energized so as to activate the LED driving circuit 600 for the second time delay 735. At the end of the second time delay 735, the output 739 of the self-diagnostic circuit 720 is de-energized. The first time delay 734 and the second time delay 735 form a sequence with a duration of T1+T2. The sequence with the duration of T1+T2 repeats (736 and 737, for example) until the third DC voltage is removed from the self-diagnostic circuit 720. In FIG. 4, the input 738 shown comprises two levels "0" and "1", in which "0" means no voltage appeared at the input 738 of the self-diagnostic circuit 720 whereas "1" means the third DC voltage is applied. Similarly, the output 739 shown comprises two levels "0" and "1", in which "0" means no voltage appeared or de-energized at the output 739 of the self-diagnostic circuit 720 whereas "1" means that the output 739 of the self-diagnostic circuit 720 provides an output voltage or is energized.

Figure 5:
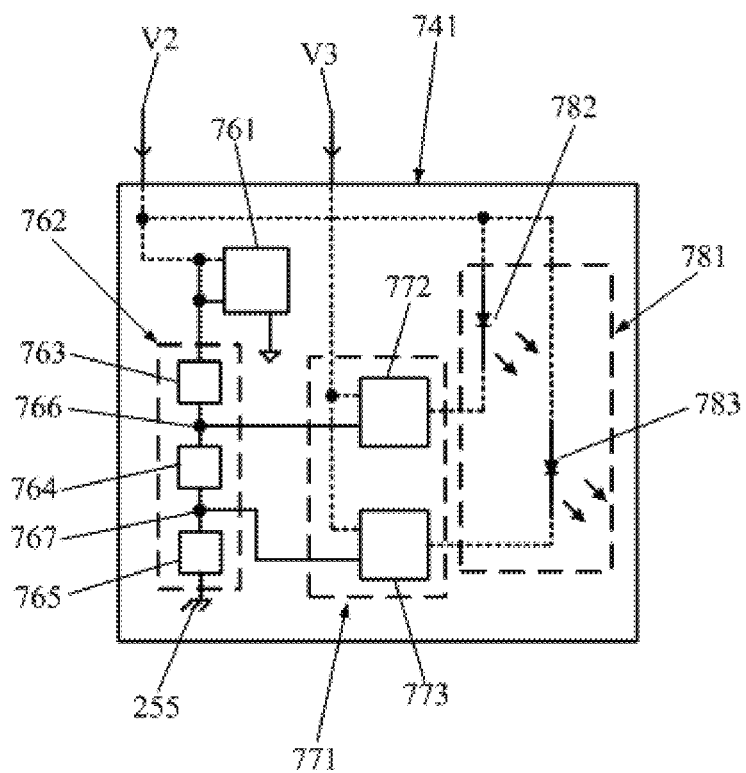
FIG. 5 is a block diagram of multiple detection circuits according to the present disclosure.

FIG. 5 is an embodiment of multiple detection circuits according to the present disclosure. The multiple detection circuits 741 comprises a precision voltage regulator 761, a series of voltage dividers 762 coupled to the precision voltage regulator 761, one or more detectors 771, and one or more LED indicators 781. The precision voltage regulator 761 and the series of the voltage dividers 762 are configured to provide voltage references for the one or more detectors 771 to test the third DC voltage and to identify operational statuses. The series of the voltage dividers 762 comprises one or more resistors 763, 764, and 765 connected in series. At least one of the voltage references 766 is configured for one of the one or more detectors 771, say 772, to identify if charging of the rechargeable battery 500 is normal. At least one of the one or more LED indicators 781 is configured to light up to indicate such a normal status. The at least one of the one or more LED indicators 781 is further configured to shut off to indicate that the rechargeable battery 500 is fully charged. At least another one of the voltage references 767 is configured for another one of the one or more detectors 771, say 773, to identify if charging of the rechargeable battery 500 is abnormal. Another one of the one or more LED indicators 783 is configured to light up to indicate such an abnormal status. The multiple detection circuits 741 may be configured to test battery charge and discharge current. At least one of the multiple detection circuits 741 comprises the first reference voltage 766. The at least one of the multiple detection circuits 741 is configured to receive the second DC voltage. When the second DC voltage is tested to be less than the first reference voltage 766 during the first time delay, the at least one of the multiple detection circuits 741 outputs a first malfunction signal to indicate that the battery charge current does not reach a predetermined minimum. At least another one of the multiple detection circuits 741 comprises a second reference voltage 767. The at least another one of the multiple detection circuits 741 is configured to receive the third DC voltage. When the third DC voltage is tested to be less than the second reference voltage 767 during the second time delay, the at least another one of the multiple detection circuits 741 outputs a second malfunction signal to indicate that the battery discharge current does not reach a predetermined minimum. The second reference voltage 767 may be referred to as a nominal voltage in a range from 85% to 87.5% of either a rated terminal voltage of the rechargeable battery 500 or the third DC voltage before testing. In FIG. 1, the self-diagnostic circuit 720 further comprises an interface circuit 721 configured to communicate and coordinate with the charging circuit 403, the rechargeable battery 500, the LED driving circuit 600, and the multiple timers 731 for proper operations and rechargeable battery tests. The interface circuit 721 may be configured to couple to D+D− ports of the external luminaire to control thereof. The self-diagnostic circuit 720 may be implemented by using a microcontroller, a microchip, or a programmable logic controller.

Figure 6:
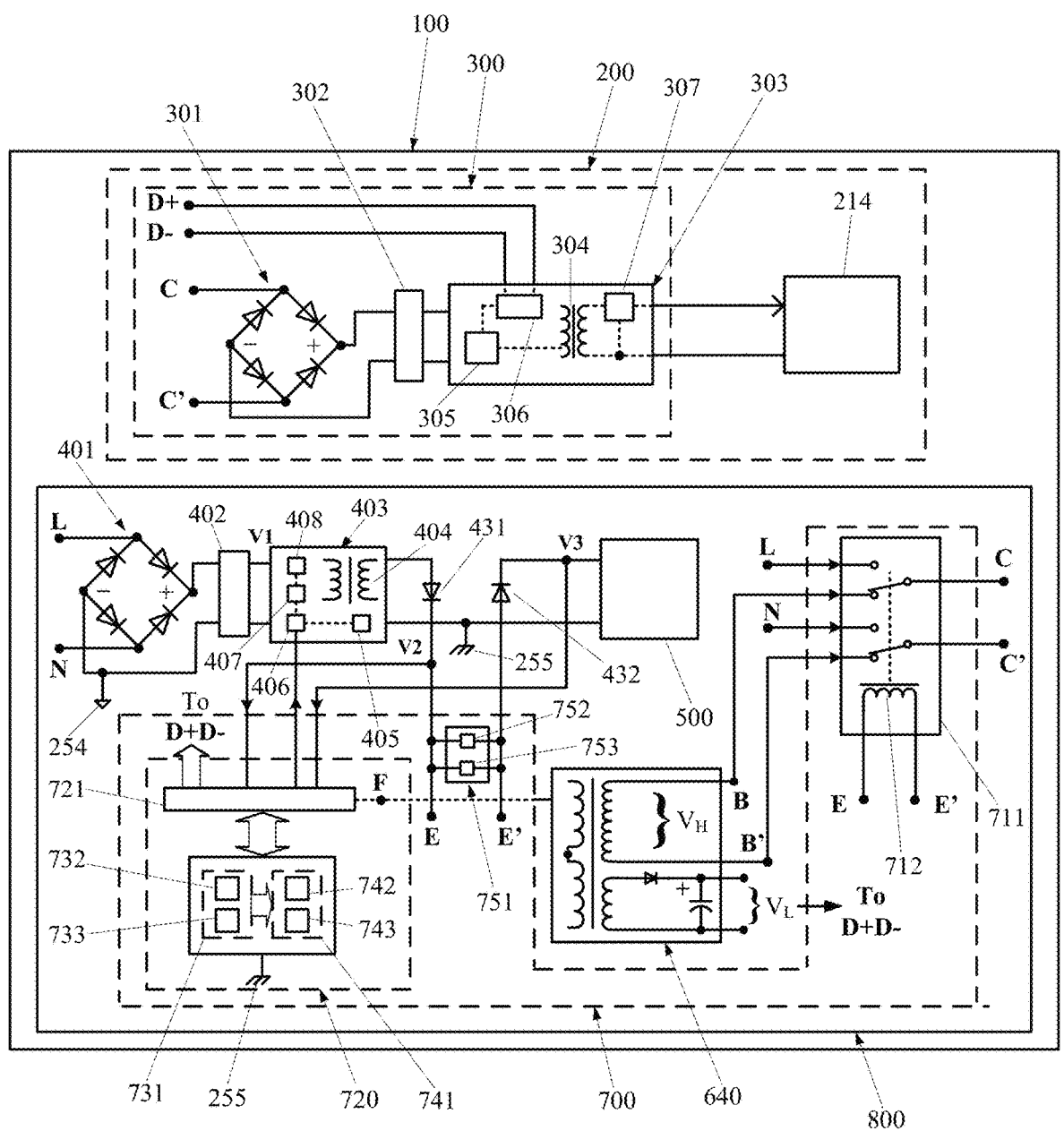
FIG. 6 is a block diagram of a first embodiment of an LED lighting system with a luminaire power pack cascaded by a luminaire according to the present disclosure.

FIG. 6 is a block diagram of a first embodiment of an LED lighting system with a luminaire power pack cascaded by a luminaire according to the present disclosure. In FIG. 6, the LED lighting system 100 comprises a luminaire 200 and a luminaire power pack 800. The luminaire power pack 800 is basically the same as depicted in FIG. 1. The luminaire 200 comprises one or more LED arrays 214 with a forward voltage across thereof and a power supply unit 300 originally designed to receive the line voltage from the AC mains at ports denoted as "CC"' for high-power lighting applications. When the line voltage from the AC mains is inputted, the power supply unit 300 generates a secondary DC voltage and a rated current to normally operate the one or more LED arrays 214. However, the luminaire power pack 800 is cascaded by the luminaire 200 powered by the luminaire power pack 800. When the line voltage from the AC mains is unavailable, the luminaire power pack 800 is automatically started to provide the at least one high output voltage, $V_H$, to the luminaire 200 with a fraction of a rated power that is designed for the power supply unit 300. In this case, the power supply unit 300 is unable to provide a sufficient driving current to drive the one or more LED arrays 214, resulting in a phenomenon of strobing on the luminaire 200.

In FIG. 6, the luminaire power pack 800 comprises a rechargeable battery 500, at least one full-wave rectifier 401, an input filter 402, a charging circuit 403, the first embodiment 640 (FIG. 2) of the LED driving circuit 600, and a line voltage detection and control circuit 700. In FIG. 6, the at least one full-wave rectifier 401 is coupled to the AC mains and configured to convert the line voltage from the AC mains denoted as "L" and "N" into a first DC voltage, V1, after the input filter 402. The charging circuit 403 is an isolated step-down converter and comprises a first ground reference 254, a second ground reference 255 electrically isolated from the first ground reference 254, a first transformer 404, a feedback control circuit 405, a control device 406, a first electronic switch 407, and a diode 408. The charging circuit 403 is coupled to the at least one full-wave rectifier 401 via the input filter 402 and configured to convert the first DC voltage, V1, into a second DC voltage, V2, that charges the rechargeable battery 500 to reach a third DC voltage, V3. The feedback control circuit 405 is configured to monitor the second DC voltage, V2, and to regulate the control device 406 according to charging voltage and current requirements. The first transformer 404 comprises a primary winding coupled to the first ground reference 254 and a secondary winding coupled to the second ground reference 255. The first transformer 404 is configured to provide electrical isolation between the AC mains and the second DC voltage, V2, with respect to the second ground reference 255.

In FIG. 6, the first embodiment 640 of the LED driving circuit 600 comprises a second transformer 601 having a primary side 610 and a secondary side 620. The secondary side 620 comprises a secondary winding 621 and a third winding 622 (FIG. 2). The first embodiment 640 of the LED driving circuit 600 is configured to receive the third DC voltage, V3, from the rechargeable battery 500 and to convert the third DC voltage, V3, into at least one high output voltage, $V_H$, and at least one low DC output voltage, $V_L$, when the line voltage from the AC mains is unavailable (FIG. 2). The at least one high output voltage, $V_H$, is compatible to a voltage in an input operating voltage range of the power supply unit 300 whereas the at least one low DC output voltage is compatible to a voltage in a range of 0-to-10 volts. The secondary side 620 further comprises a rectifier 623 and at least one capacitor 624. The rectifier 623 and the at least one capacitor 624 are configured to couple to the third winding 622 and to generate the at least one low DC output voltage, $V_L$, when the line voltage from the AC mains is unavailable. The at least one low DC output voltage, $V_L$, is configured to control the power supply unit 300 to operate with a fraction of power consumed when the line voltage from the AC mains is available, whereas a combination of the at least one low DC output voltage $V_L$, and the at least one high output voltage, $V_H$, is configured to maintain stability of the power supply unit 300 in a way that the one or more LED arrays 214 are operated without strobing. The primary side 610 comprises a control unit 611, a second electronic switch 612, a third electronic switch 613, an upper portion 615 of a center-tapped winding, a lower portion 616 of the center-tapped winding, and a center-tapped port 617 coupled between the upper portion 615 of the center-tapped winding and the lower portion 616 of the center-tapped winding. The center-tapped port 617 is coupled to a high-potential electrode of the rechargeable battery 500 via an inductor 614. The upper portion 615 of the center-tapped winding is driven in one direction of a current flow with the second electronic switch 612 activated, whereas the lower portion 616 of the center-tapped winding is driven in the opposite direction of the current flow with the third electronic switch 613 activated. Each of the first electronic switch 407, the second electronic switch 612, and the third electronic switch 613 comprises a metal-oxide-semiconductor field-effect transistor (MOSFET) or a transistor.

In FIG. 6, the line voltage detection and control circuit 700 comprises a relay switch 711. The relay switch 711 comprises a power sensing coil 712 with a pick-up voltage and a drop-out voltage and is configured to couple either the at least one high output voltage, $V_H$, or the line voltage from the AC mains to the power supply unit 300 to operate thereof, subsequently powering up one or more LED arrays 214 connected with the power supply unit 300. The line voltage detection and control circuit 700 further comprises a self-diagnostic circuit 720. The line voltage detection and control circuit 700 is configured to either enable or disable the first embodiment 640 of the LED driving circuit 600 via the port denoted as "F" according to availability of the AC mains. The self-diagnostic circuit 720 comprises multiple timers 731 and multiple detection circuits 741. The multiple timers 731 and the multiple detection circuits 741 are configured to auto-test charging and discharging current of the rechargeable battery 500. The self-diagnostic circuit 720 is further configured to disable the relay switch 711 when required. The line voltage detection and control circuit 700 further comprises a coupling module 751 comprising a flyback diode 752 and a capacitor 753 connected in parallel with the flyback diode 752, in which the flyback diode 752 is with a reverse polarity from the second DC voltage, V2. The coupling module 751 is connected in parallel with the power sensing coil 712. When the second DC voltage, V2, is greater than the third DC voltage, V3, the pick-up voltage is built up for the power sensing coil 712 to operate. In FIG. 6, the line voltage detection and control circuit 700 further comprises a first and a second current guiding diodes 431 and 432. The first current guiding diode 431 and the second current guiding diode 432 are configured to conduct a charging current in one direction and a discharging current in another direction such that the second DC voltage, V2, is distinct from the third DC voltage, V3. The charging circuit 403 may further comprise at least one capacitor (not shown) between the second DC voltage, V2, and the second ground reference 255. In FIG. 6, the control device 406 is configured to receive a signal voltage from the self-diagnostic circuit 720. When a rechargeable battery test is performed, the self-diagnostic circuit 720 is energized to activate the first embodiment 640 of the LED driving circuit 600 and to pull down the signal voltage, thereby inactivating the charging circuit 403.

The relay switch 711 further comprises a first pair, a second pair, and a third pair of input electrical terminals. The first pair of input electrical terminals denoted as "L" and "N" are configured to couple to the line voltage from the AC mains, whereas the second pair of input electrical terminals denoted as "BB'" are configured to couple to the at least one high output voltage, $V_H$. The third pair of input electrical terminals denoted as "EE'" are configured to receive the pick-up voltage to operate the power sensing coil 712. The relay switch 711 further comprises a pair of output electrical terminals denoted as "CC'" configured to relay either the line voltage from the AC mains or the at least one high output voltage, $V_H$, to the power supply unit 300 to operate thereon. In this case, the relay switch 711 comprises a double-pole double-throw (DPDT) configuration, in which either the line voltage from the AC mains or the at least one high output voltage, $V_H$, can be simultaneously coupled to the power supply unit 300 to respectively operate thereon without crosstalk. Although both the line voltage from the AC mains and the at least one high output voltage, $V_H$, can operate the external power supply unit 300, the at least one high output voltage, $V_H$, may be less than the line voltage from the AC mains. Nevertheless, the at least one high output voltage, $V_H$, is within an input operating voltage range of the power supply unit 300 to avoid the under-voltage lockout occurring. Besides, the first embodiment 640 of the LED driving circuit 600 provides a fraction of power the power supply unit 300 consumes when the line voltage from the AC mains is available.

In FIG. 6, the line voltage detection and control circuit 700 further comprises a coupling module 751 comprising a flyback diode 752 and a capacitor 753 connected in parallel with the flyback diode 752, in which the flyback diode 752 is with a reverse polarity from the second DC voltage, V2. The coupling module 751 is connected in parallel with the power sensing coil 712. When the second DC voltage, V2, is greater than the third DC voltage, V3, the pick-up voltage is built up for the power sensing coil 712 to operate. In FIG. 6, the line voltage detection and control circuit 700 further comprises a first and a second current guiding diodes 431 and 432. The first current guiding diode 431 and the second current guiding diode 432 are configured to conduct a charging current in one direction and a discharging current in another direction such that the second DC voltage, V2, is distinct from the third DC voltage, V3. The charging circuit 403 may further comprise at least one capacitor (not shown) between the second DC voltage, V2, and the second ground reference 255.

In FIG. 6, the power supply unit 300 comprises at least two electrical conductors denoted as "C" and "C'", a main full-wave rectifier 301, and an input filter 302. The at least two electrical conductors denoted as "C" and "C'" are configured to couple to "CC'" ports in the luminaire power pack 800 and to convert either the line voltage from the AC mains or the at least one high output voltage $V_H$ into a primary DC voltage. The input filter 302 is configured to suppress electromagnetic interference (EMI) noises. The power supply unit 300 further comprises a power switching converter 303 comprising a main transformer 304 and a power factor correction (PFC) and power switching circuit 305. The PFC and power switching circuit 305 is coupled to the main full-wave rectifier 301 via the input filter 302 and configured to improve a power factor and to convert the primary DC voltage into a secondary DC voltage. The secondary DC voltage is configured to couple to the one or more LED arrays 214 to operate thereof. The power switching converter 303 further comprises a pulse width modulation (PWM) control circuit 306 and a pair of input ports denoted as "D+D−" configured to receive a 0-to-10 V signal, a 1-to-10 V signal, a PWM signal, or a signal from a variable resistor for luminaire dimming applications. The pair of input ports denoted as "D+D−" are coupled to the first embodiment 640 of the LED driving circuit 600 to receive the at least one low DC output voltage, $V_L$. The PFC and power switching circuit 305 is basically a current source, in which when the one or more LED arrays require more current than a predetermined maximum, the secondary DC voltage drops accordingly to maintain power conservation. In FIG. 6, although configured to directly couple to the winding 621 without rectifiers and filters, the at least one high output voltage $V_H$ may be a DC voltage via the rectifiers and the filters coupled to the winding 621. If this is the case, the main full-wave rectifier 301 in FIG. 6 can still pass such a DC voltage to the power switching converter 303 to work.

In FIG. 6, the self-diagnostic circuit 720 further comprises an interface circuit 721 configured to communicate and coordinate with the charging circuit 403, the rechargeable battery 500, the first embodiment of the LED driving circuit 600, the power switching converter 303, and the multiple timers 731 for proper operations and rechargeable battery tests. The interface circuit 721 may comprise a redundant dimming control to couple to the power switching converter 303 and disable thereof when the rechargeable battery test is performed. The self-diagnostic circuit 720 may be implemented by using a microcontroller, a microchip, or a programmable logic controller.

Figure 7:
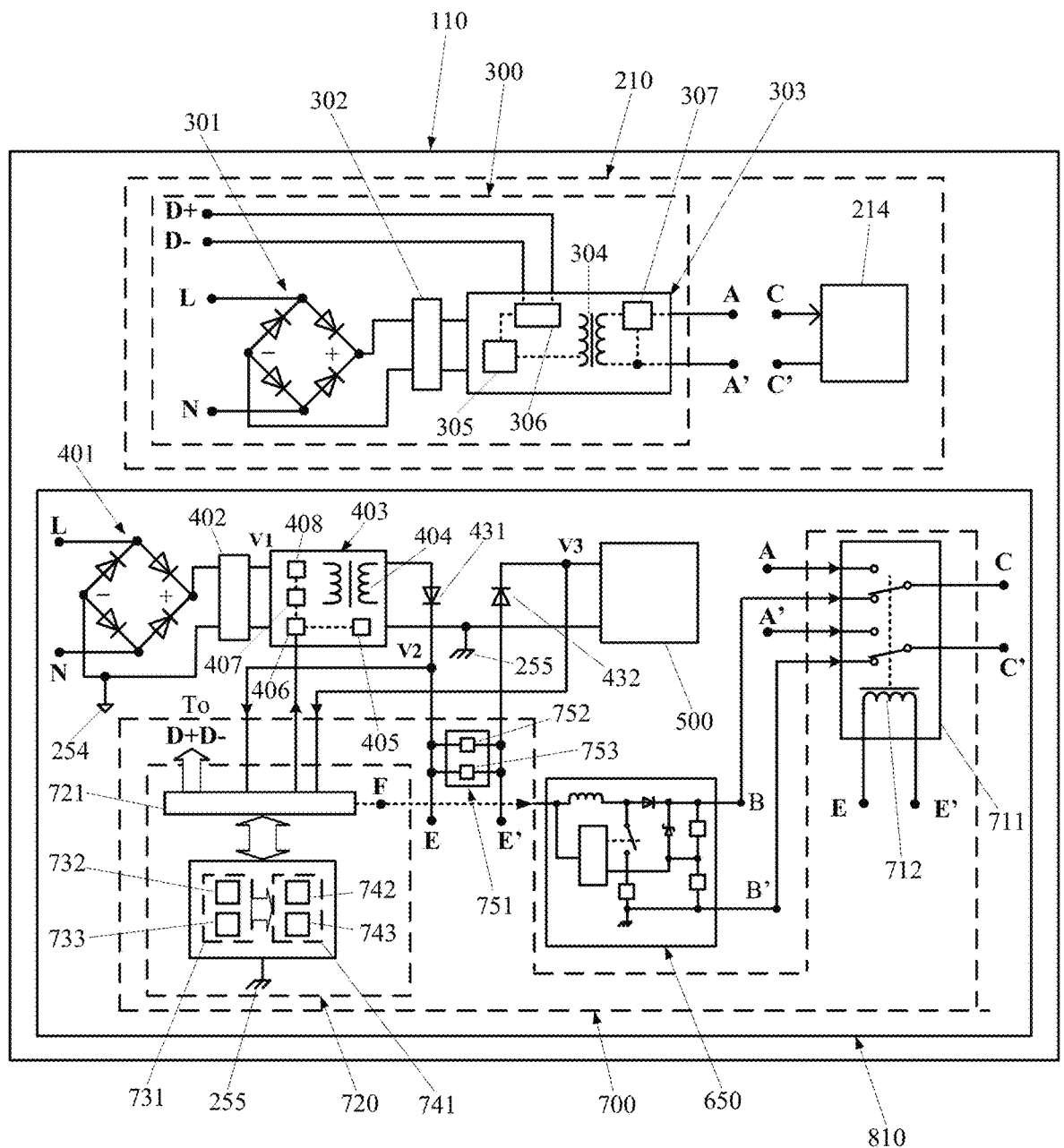
FIG. 7 is a block diagram of a second embodiment of an LED lighting system with a luminaire power pack cascaded by a luminaire according to the present disclosure.

FIG. 7 is a block diagram of a second embodiment of an LED lighting system with a luminaire power pack cascaded by a luminaire according to the present disclosure. In FIG. 7, an LED lighting system 110 comprises a luminaire 210 and a luminaire power pack 810. The luminaire 210 is almost the same as the luminaire 200 depicted in FIG. 6 except that the main full-wave rectifier 310 is directly coupled to the line voltage from the AC mains and that output ports denoted as "AA'" of the power switching converter 303 are coupled to the first pair of input electrical terminals AA' of the relay switch 711 whereas the pair of output electrical terminals CC' of the relay switch 711 are coupled to the one or more LED arrays 214. The luminaire power pack 810 is almost the same as the luminaire power pack 800 depicted in FIG. 6 except that the second embodiment 650 of the LED driving circuit 600 is replaced the first embodiment 640 of the LED driving circuit 600. In other words, in the normal mode when the line voltage from the AC mains is available, the power supply unit 300 provides the secondary DC voltage to the first pair of input electrical terminals AA' of the relay switch 711 whereas the pair of output electrical terminals CC' of the relay switch 711 are coupled to the one or more LED arrays 214. In this case, the secondary DC voltage is indirectly coupled to the one or more LED arrays 214 and operates thereof. In the emergency mode when the line voltage from the AC mains is unavailable, the power supply unit 300 is disabled due to no power coming in, whereas the rechargeable battery provides power to the second embodiment 650 of the LED driving circuit 600 to generate the fifth DC voltage that is greater than the forward voltage of the one or more LED arrays 214. The fifth DC voltage is sent to the second pair of input electrical terminals BB' of the relay switch 711 whereas the pair of output electrical terminals CC' of the relay switch 711 are coupled to the one or more LED arrays 214. In this case, the fifth DC voltage is indirectly coupled to the one or more LED arrays 214 and operates thereof. The self-diagnostic circuit 720 may be implemented by using a microcontroller, a microchip, or a programmable logic controller. In FIG. 7, the self-diagnostic circuit 720 has all the functions and features depicted as in FIG. 6.

Figure 8:
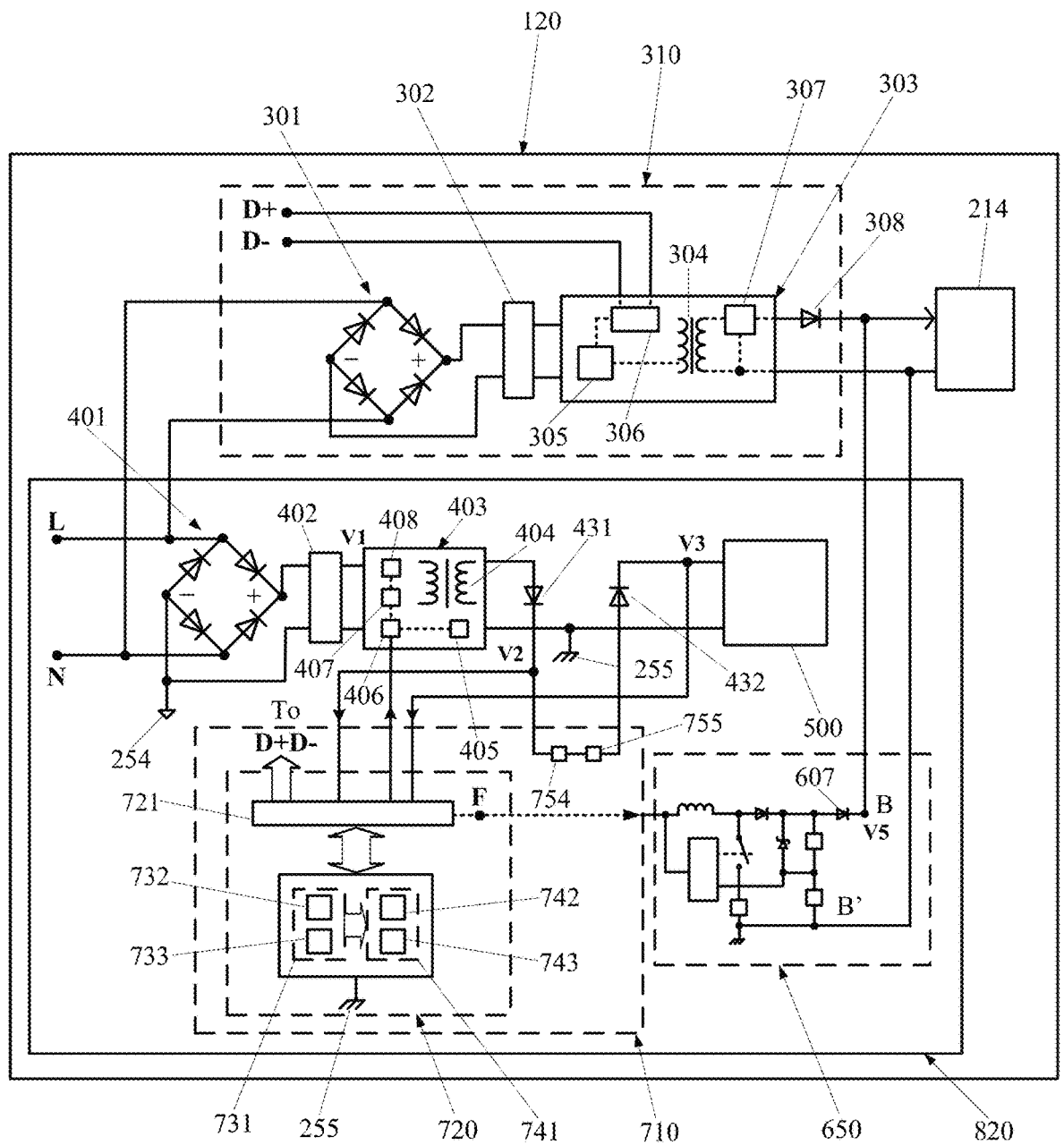
FIG. 8 is a block diagram of an enhanced LED luminaire according to the present disclosure.

FIG. 8 is a block diagram of an enhanced LED luminaire according to the present disclosure. In FIG. 8, an enhanced LED luminaire 120 comprises a power supply unit 310, one or more LED arrays 214, and a luminaire power pack 820. The power supply unit 310 is almost the same as the power supply unit 300 depicted in FIG. 7 except that a first current blocking diode 308 is coupled to both the power switching converter 303 at one end of the first current blocking diode 308 and the one or more LED arrays 214 at the other end of the first current blocking diode 308. The luminaire power pack 820 is almost the same as the luminaire power pack 810 depicted in FIG. 7 except that the relay switch 711 is completely removed from the luminaire power pack 820 whereas the fifth DC voltage is directly coupled to the one or more LED arrays 214 via a second current blocking diode 607. Besides, the line voltage detection and control circuit 700 in FIG. 7 is replaced by the line voltage detection and control circuit 710 in FIG. 8. The line voltage detection and control circuit 710 comprises the self-diagnostic circuit 720, at least one diode 754, and at least one resistor 755. In other words, the coupling module 751 depicted in FIG. 7 is replaced by the at least one diode 754 and the at least one resistor 755 connected in series with the at least one diode 754. The at least one diode 754 and the at least one resistor 755 are electrically coupled between the charging circuit 403 and the rechargeable battery 500 and configured to control a current flowing direction and to set up a voltage drop so that the line voltage detection and control circuit 700 can readily determine whether the line voltage from the AC mains is available or not. The first current blocking diode 308 is configured to couple to the one or more LED arrays 214 to prevent an LED driving current provided by the second embodiment 650 of the LED driving circuit 600 from flowing in, avoiding crosstalk. Similarly, the second current blocking diode 607 is configured to couple to the one or more LED arrays 214 to prevent an LED driving current provided by the power supply unit 310 from flowing in, avoiding crosstalk. In FIG. 8, the power supply unit 310 further comprises a pulse width modulation (PWM) control circuit 306 and a pair of input ports D+D− configured to receive a 0-to-10 V (volts) signal, a 1-to-10 V (volts) signal, a PWM signal, or a signal from a variable resistor for dimming applications as in FIG. 6 and FIG. 7. In FIG. 8, in the normal mode when the line voltage from the AC mains is available, the power supply unit 300 provides the secondary DC voltage to the one or more LED arrays 214 via the first current blocking diode 308 and operates thereof. In the emergency mode when the line voltage from the AC mains is unavailable, the power supply unit 300 is disabled, whereas the rechargeable battery provides power to the second embodiment 650 of the LED driving circuit 600 to generate the fifth DC voltage that is greater than the forward voltage of the one or more LED arrays 214. The fifth DC voltage is coupled to the one or more LED arrays 214 via the second current blocking diode 607 and operates the one or more LED arrays 214. Specifically, the pair of input ports D+D− are configured to receive a dimming signal from the interface circuit 721 to disable the power supply unit 310 when the rechargeable battery test is performed. The self-diagnostic circuit 720 may be implemented by using a microcontroller, a microchip, or a programmable logic controller. In FIG. 8, the self-diagnostic circuit 720, the power switching converter 303, and the second embodiment 650 of the LED driving circuit 600 have all the functions and features depicted as in FIG. 7.

Whereas preferred embodiments of the present disclosure have been shown and described, it will be realized that alterations, modifications, and improvements may be made thereto without departing from the scope of the following claims. Another kind of schemes with a luminaire power pack adopted in an LED lighting system to operate a luminaire or such a luminaire power pack integrated in an enhanced luminaire using various kinds of combinations to accomplish the same or different objectives could be easily adapted for use from the present disclosure. Accordingly, the foregoing descriptions and attached drawings are by way of example only and are not intended to be limiting.

What is claimed is:

1. A luminaire power pack, comprising:
   at least two electrical conductors configured to couple to alternate-current (AC) mains;
   a rechargeable battery;
   at least one full-wave rectifier coupled to the at least two electrical conductors and configured to convert a line voltage from the AC mains into a first direct-current (DC) voltage;
   at least one input filter coupled to the at least one full-wave rectifier, the at least one input filter configured to suppress an electromagnetic interference (EMI) noise;
   a charging circuit comprising a control device, a first transformer, a first ground reference, and a second ground reference electrically isolated from the first ground reference, the charging circuit coupled to the at least one full-wave rectifier via the at least one input filter and configured to convert the first DC voltage into a second DC voltage that charges a voltage level of the rechargeable battery to reach a third DC voltage;
   a light-emitting diode (LED) driving circuit comprising a step-up converter and the second ground reference, the LED driving circuit configured to receive the third DC voltage from the rechargeable battery and to convert the third DC voltage into a fourth AC or DC voltage when the line voltage from the AC mains is unavailable; and
   a line voltage detection and control circuit comprising a self-diagnostic circuit and a relay switch, the line voltage detection and control circuit configured to enable or disable the LED driving circuit according to availability of the AC mains, and the relay switch comprising a power sensing coil with a pick-up voltage,
   wherein:
       the self-diagnostic circuit comprises multiple timers, wherein each of the multiple timers respectively comprises a first time delay and a second time delay, wherein upon application of the third DC voltage to the self-diagnostic circuit, the first time delay in each of the multiple timers begins, wherein at an end of the first time delay an output of the self-diagnostic circuit is energized and remains energized so as to activate the LED driving circuit for the second time delay in each of the multiple timers, wherein at an end of the second time delay in each of the multiple timers the output of the self-diagnostic circuit is de-energized, wherein the first time delay and the second time delay in each of the multiple timers form a sequence, and wherein the sequence repeats until the third DC voltage is removed from the self-diagnostic circuit;

the relay switch further comprises a first pair of input electrical terminals, a second pair of input electrical terminals, and a third pair of input electrical terminals, and wherein the third pair of input electrical terminals are configured to receive the pick-up voltage to operate the power sensing coil; and the relay switch further comprises a pair of output electrical terminals configured to relay either a first input voltage appeared at the first pair of input electrical terminals or the fourth AC or DC voltage appeared at the second pair of input electrical terminals to the pair of output electrical terminals when the relay switch is activated.

2. The luminaire power pack of claim 1, wherein the control device is configured to receive a signal voltage from the self-diagnostic circuit, and wherein, when a rechargeable battery test is performed, the self-diagnostic circuit is energized to activate the LED driving circuit and to pull down the signal voltage, thereby inactivating the charging circuit.

3. The luminaire power pack of claim 1, wherein the respective first time delay in at least one of the multiple timers comprises a first time delay of 30 days, and wherein the respective second time delay in at least one of the multiple timers comprises a second time delay of 30 seconds.

4. The luminaire power pack of claim 1, wherein the respective first time delay in at least one of the multiple timers comprises a first time delay of 365 days, and wherein the respective second time delay in at least one of the multiple timers comprises a second time delay of 90 minutes.

5. The luminaire power pack of claim 1, wherein the self-diagnostic circuit further comprises multiple detection circuits configured to test battery charge and discharge current of the rechargeable battery.

6. The luminaire power pack of claim 5, wherein at least one of the multiple detection circuits comprises a first reference voltage, wherein the at least one of the multiple detection circuits is configured to receive the second DC voltage, and wherein, when the second DC voltage is tested to be less than the first reference voltage during the first time delay, the at least one of the multiple detection circuits outputs a first malfunction signal to indicate that the battery charge current does not reach a predetermined minimum.

7. The luminaire power pack of claim 5, wherein at least one of the multiple detection circuits comprises a second reference voltage, wherein the at least one of the multiple detection circuits is configured to receive the third DC voltage, and wherein, when the third DC voltage is tested to be less than the second reference voltage during the second time delay, the at least one of the multiple detection circuits outputs a second malfunction signal to indicate that the battery discharge current does not reach a predetermined minimum.

8. The luminaire power pack of claim 7, wherein the second reference voltage is referred to as a nominal voltage in a range from 85% to 87.5% of either a rated terminal voltage of the rechargeable battery or the third DC voltage before testing.

9. The luminaire power pack of claim 1, wherein the first input voltage is the line voltage from the AC mains, wherein the fourth AC or DC voltage is a high voltage in an input operating voltage range of an external luminaire configured to couple to the luminaire power pack.

10. The luminaire power pack of claim 9, wherein the self-diagnostic circuit further comprises an interface circuit configured to communicate and coordinate with the charging circuit, the rechargeable battery, the LED driving circuit, the external luminaire, and the multiple timers for proper operations and rechargeable battery tests.

11. The luminaire power pack of claim 1, wherein the first input voltage is an external DC voltage configured to operate external one or more LED arrays, wherein the fourth AC or DC voltage is rectified by a rectifier as a fifth DC voltage, and wherein the fifth DC voltage is greater than a forward voltage of the external one or more LED arrays.

12. The luminaire power pack of claim 1, wherein the line voltage detection and control circuit further comprises a flyback diode and a capacitor connected in parallel with the flyback diode, wherein the flyback diode is connected in parallel with the power sensing coil and is with a reverse polarity from the second DC voltage, wherein, when the second DC voltage is greater than the third DC voltage, the pick-up voltage is built up for the power sensing coil to operate, and wherein the power sensing coil is configured to provide a current path to charge the rechargeable battery.

13. The luminaire power pack of claim 1, wherein the self-diagnostic circuit comprises a microcontroller, a microchip, or a programmable logic controller.

14. A light-emitting diode (LED) lighting system, comprising:

a luminaire, comprising:
one or more LED arrays with an LED forward voltage; and
a power supply unit with an input operating voltage range, comprising:
at least two electrical conductors configured to receive an input voltage;
an input filter configured to suppress electromagnetic interference (EMI) noises;
a main full-wave rectifier coupled to the at least two electrical conductors, the main full-wave rectifier configured to convert the input voltage from the at least two electrical conductors into a primary direct-current (DC) voltage;
a power switching converter comprising a main transformer and a power factor correction (PFC) and power switching circuit, wherein the PFC and power switching circuit is coupled to the main full-wave rectifier via the input filter and configured to improve a power factor and to convert the primary DC voltage into a secondary DC voltage that is either directly or indirectly coupled to the one or more LED arrays to operate thereof; and
a luminaire power pack, comprising:
at least two electrical conductors configured to couple to alternate-current (AC) mains;
a rechargeable battery;
at least one full-wave rectifier coupled to the at least two electrical conductors and configured to convert a line voltage from the AC mains into a first DC voltage;
at least one input filter coupled to the at least one full-wave rectifier, the at least one input filter configured to suppress an electromagnetic interference (EMI) noise;
a charging circuit comprising a control device, a first transformer, a first ground reference, and a second ground reference electrically isolated from the first ground reference, the charging circuit coupled to the at least one full-wave rectifier via the at least one input filter and configured to convert the first DC voltage into a second DC voltage that charges a voltage level of the rechargeable battery to reach a third DC voltage;

an LED driving circuit comprising a step-up converter comprising the second ground reference and a second transformer having a primary winding and a secondary winding, wherein the LED driving circuit is configured to receive the third DC voltage from the rechargeable battery and to convert the third DC voltage into a fourth AC or DC voltage when the line voltage from the AC mains is unavailable; and a line voltage detection and control circuit comprising a self-diagnostic circuit and a relay switch, the line voltage detection and control circuit configured to enable or disable the LED driving circuit according to availability of the AC mains, and the relay switch comprising a power sensing coil with a pick-up voltage, wherein:

the self-diagnostic circuit comprises multiple timers, wherein each of the multiple timers respectively comprises a first time delay and a second time delay, wherein upon application of the third DC voltage to the self-diagnostic circuit, the first time delay in each of the multiple timers begins, wherein at an end of the first time delay an output of the self-diagnostic circuit is energized and remains energized so as to activate the LED driving circuit for the second time delay in each of the multiple timers, wherein at an end of the second time delay in each of the multiple timers the output of the self-diagnostic circuit is de-energized, wherein the first time delay and the second time delay in each of the multiple timers form a sequence, and wherein the sequence repeats until the third DC voltage is removed from the self-diagnostic circuit;

the relay switch further comprises a first pair of input electrical terminals, a second pair of input electrical terminals, and a third pair of input electrical terminals, and wherein the third pair of input electrical terminals are configured to receive the pick-up voltage to operate the power sensing coil; and the relay switch further comprises a pair of output electrical terminals configured to relay either a first input voltage appeared at the first pair of input electrical terminals or the fourth AC or DC voltage appeared at the second pair of input electrical terminals to the pair of output electrical terminals when the relay switch is activated.

15. The LED lighting system of claim 14, wherein the control device is configured to receive a signal voltage from the self-diagnostic circuit, and wherein, when a rechargeable battery test is performed, the self-diagnostic circuit is energized to activate the LED driving circuit and to pull down the signal voltage, thereby inactivating the charging circuit.

16. The LED lighting system of claim 14, wherein the respective first time delay in at least one of the multiple timers comprises a first time delay of 30 days, and wherein the respective second time delay in at least one of the multiple timers comprises a second time delay of 30 seconds.

17. The LED lighting system of claim 14, wherein the respective first time delay in at least one of the multiple timers comprises a first time delay of 365 days, and wherein the respective second time delay in at least one of the multiple timers comprises a second time delay of 90 minutes.

18. The LED lighting system of claim 14, wherein the self-diagnostic circuit further comprises multiple detection circuits configured to test charge and discharge current of the rechargeable battery.

19. The LED lighting system of claim 18, wherein at least one of the multiple detection circuits comprises a first reference voltage, wherein the at least one of the multiple detection circuits is configured to receive the second DC voltage, and wherein, when the second DC voltage is tested to be less than the first reference voltage during the first time delay, the at least one of the multiple detection circuits outputs a first malfunction signal to indicate that the battery charge current does not reach a predetermined minimum.

20. The LED lighting system of claim 18, wherein at least one of the multiple detection circuits comprises a second reference voltage, wherein the at least one of the multiple detection circuits is configured to receive the third DC voltage, and wherein, when the third DC voltage is tested to be less than the second reference voltage during the second time delay, the at least one of the multiple detection circuits outputs a second malfunction signal to indicate that the battery discharge current does not reach a predetermined minimum.

21. The LED lighting system of claim 20, wherein the second reference voltage is referred to as a nominal voltage in a range from 85% to 87.5% of either a rated terminal voltage of the rechargeable battery or the third DC voltage before testing.

22. The LED lighting system of claim 14, wherein the first input voltage is the line voltage from the AC mains, wherein the fourth AC or DC voltage is a high voltage in the input operating voltage range of the power supply unit.

23. The LED lighting system of claim 22, wherein the second transformer further comprises a third winding, a rectifier, and at least one capacitor, the rectifier and the at least one capacitor configured to couple to the third winding and to generate at least one low DC output voltage compatible to 0-to-10 V (volts) when the line voltage from the AC mains is unavailable.

24. The LED lighting system of claim 23, wherein the power switching converter further comprises a pulse width modulation (PWM) control circuit and a pair of input ports configured to receive a 0-to-10 V (volts) signal, a 1-to-10 V (volts) signal, a PWM signal, or a signal from a variable resistor for luminaire dimming applications.

25. The LED lighting system of claim 24, wherein the at least one low DC output voltage is configured to send to the power switching converter and to control the power supply unit to operate with a fraction of power consumed when the line voltage from the AC mains is available, and wherein a combination of the at least one low DC output voltage and the high voltage is configured to maintain stability of the power supply unit in a way that the one or more LED arrays are operated without strobing.

26. The luminaire power pack of claim 24, wherein the self-diagnostic circuit further comprises an interface circuit configured to communicate and coordinate with the charging circuit, the rechargeable battery, the LED driving circuit, the power switching converter, and the multiple timers for proper operations and rechargeable battery tests.

27. The LED lighting system of claim 14, wherein the first input voltage is the secondary DC voltage from the power supply unit, wherein the fourth AC or DC voltage is rectified by a rectifier as a fifth DC voltage, and wherein the fifth DC voltage is greater than the forward voltage of the one or more LED arrays.

28. The LED lighting system of claim 14, wherein the line voltage detection and control circuit further comprises a flyback diode and a capacitor connected in parallel with the flyback diode, wherein the flyback diode is connected in parallel with the power sensing coil and is with a reverse polarity from the second DC voltage, wherein, when the second DC voltage is greater than the third DC voltage, the pick-up voltage is built up for the power sensing coil to operate, and wherein the power sensing coil is configured to provide a current path to charge the rechargeable battery.

29. The LED lighting system of claim 14, wherein the self-diagnostic circuit comprises a microcontroller, a microchip, or a programmable logic controller.

30. An enhanced light-emitting diode (LED) luminaire, comprising:
at least two electrical conductors configured to couple to alternate-current (AC) mains;
one or more LED arrays with a forward voltage across thereon;
a rechargeable battery;
at least one full-wave rectifier coupled to the at least two electrical conductors and configured to convert a line voltage from the AC mains into a first direct-current (DC) voltage;
at least one input filter coupled to the at least one full-wave rectifier, the at least one input filter configured to suppress an electromagnetic interference (EMI) noise;
a charging circuit comprising a control device, a first transformer, a first ground reference, and a second ground reference electrically isolated from the first ground reference, the charging circuit coupled to the at least one full-wave rectifier via the at least one input filter and configured to convert the first DC voltage into a second DC voltage that charges a voltage level of the rechargeable battery to reach a third DC voltage;
an LED driving circuit comprising an input inductor, an electronic switch, at least one diode rectifier, and an output capacitor connected between the at least one diode rectifier and the second ground reference, the LED driving circuit configured to receive the third DC voltage from the rechargeable battery and to convert the third DC voltage into a fifth DC voltage to light up the one or more LED arrays when the line voltage from the AC mains is unavailable;
a power supply unit comprising a main transformer, the power supply unit configured to generate a secondary DC voltage to power up the one or more LED arrays at full power and to meet LED luminaire efficacy requirements when the line voltage from the AC mains is available; and
a line voltage detection and control circuit comprising a self-diagnostic circuit, the line voltage detection and control circuit configured to either enable or disable the LED driving circuit according to availability of the AC mains,
wherein:
the charging circuit, the LED driving circuit, the power supply unit, and the self-diagnostic circuit are configured to auto-select either the secondary DC voltage or the fifth DC voltage to operate the one or more LED arrays; and
the self-diagnostic circuit comprises multiple timers, wherein each of the multiple timers respectively comprises a first time delay and a second time delay, wherein upon application of the third DC voltage to the self-diagnostic circuit, the first time delay in each of the multiple timers begins, wherein at an end of the first time delay an output of the self-diagnostic circuit is energized and remains energized so as to activate the LED driving circuit for the second time delay in each of the multiple timers, wherein at an end of the second time delay in each of the multiple timers the output of the self-diagnostic circuit is de-energized, wherein the first time delay and the second time delay in each of the multiple timers form a sequence, and wherein the sequence repeats until the third DC voltage is removed from the self-diagnostic circuit.

31. The enhanced LED luminaire of claim 30, wherein the control device is configured to receive a signal voltage sent from the self-diagnostic circuit, and wherein, when a rechargeable battery test is performed, the self-diagnostic circuit is energized to activate the LED driving circuit and to pull down the signal voltage, thereby inactivating the charging circuit.

32. The enhanced LED luminaire of claim 30, wherein the respective first time delay in at least one of the multiple timers comprises a first time delay of 30 days, and wherein the respective second time delay in at least one of the multiple timers comprises a second time delay of 30 seconds.

33. The enhanced LED luminaire of claim 30, wherein the respective first time delay in at least one of the multiple timers comprises a first time delay of 365 days, and wherein the respective second time delay in at least one of the multiple timers comprises a second time delay of 90 minutes.

34. The enhanced LED luminaire of claim 30, wherein the self-diagnostic circuit further comprises multiple detection circuits configured to test battery charge and discharge current of the rechargeable battery.

35. The enhanced LED luminaire of claim 34, wherein at least one of the multiple detection circuits comprises a first reference voltage, wherein the at least one of the multiple detection circuits is configured to receive the second DC voltage, and wherein, when the second DC voltage is tested to be less than the first reference voltage during the first time delay, the at least one of the multiple detection circuits outputs a first malfunction signal to indicate that the battery charge current does not reach a predetermined minimum.

36. The enhanced LED luminaire of claim 34, wherein at least one of the multiple detection circuits comprises a second reference voltage, wherein the at least one of the multiple detection circuits is configured to receive the third DC voltage, and wherein, when the third DC voltage is tested to be less than the second reference voltage during the second time delay, the at least one of the multiple detection circuits outputs a second malfunction signal to indicate that the battery discharge current does not reach a predetermined minimum.

37. The enhanced LED luminaire of claim 36, wherein the second reference voltage is referred to as a nominal voltage in a range from 85% to 87.5% of either a rated terminal voltage of the rechargeable battery or the third DC voltage before testing.

38. The enhanced LED luminaire of claim 30, wherein the line voltage detection and control circuit further comprises at least one diode and at least one resistor, wherein the at least one diode and the at least one resistor are electrically coupled between the charging circuit and the rechargeable battery, wherein the at least one diode is with a forward polarity from the second DC voltage, and wherein the at least one diode and the at least one resistor are configured to control a current flowing direction and to set up a voltage drop so that the line voltage detection and control circuit can readily determine whether the line voltage from the AC mains is available or not.

39. The enhanced LED luminaire of claim 30, wherein the power supply unit further comprises a current blocking diode configured to couple to the one or more LED arrays to prevent an LED driving current provided by the LED driving circuit from flowing in, avoiding crosstalk.

40. The enhanced LED luminaire of claim 30, wherein the LED driving circuit further comprises a current blocking diode configured to couple to the one or more LED arrays to prevent an LED driving current provided by the power supply unit from flowing in, avoiding crosstalk.

41. The enhanced LED luminaire of claim 30, wherein the self-diagnostic circuit further comprises an interface circuit configured to communicate and coordinate with the charging circuit, the rechargeable battery, the LED driving circuit, the power supply unit, and the multiple timers for proper operations and rechargeable battery tests.

42. The enhanced LED luminaire of claim 41, wherein the power supply unit further comprises a pulse width modulation (PWM) control circuit and a pair of input ports configured to receive a 0-to-10 V (volts) signal, a 1-to-10 V (volts) signal, or a PWM signal from the interface circuit, and wherein the power supply unit is disabled by the interface circuit when the rechargeable battery test is performed.

43. The enhanced LED luminaire of claim 30, wherein the self-diagnostic circuit comprises a microcontroller, a microchip, or a programmable logic controller.

* * * * *